(No Model.)

J. BUSHA.
COUPLING FOR GAS PIPES.

No. 333,446. Patented Dec. 29, 1885.

Witnesses
A. A. Moore
A. N. Connolly

Inventor
Joseph Busha
by Connolly Bros
Attys

UNITED STATES PATENT OFFICE.

JOSEPH BUSHA, OF PITTSBURG, PENNSYLVANIA.

COUPLING FOR GAS-PIPES.

SPECIFICATION forming part of Letters Patent No. 333,446, dated December 29, 1885.

Application filed November 2, 1885. Serial No. 181,565. (No model.)

*To all whom it may concern:*

Be it known that I, JOSEPH BUSHA, a citizen of the United States, residing at Pittsburg, in the county of Allegheny and State of Pennsylvania, have invented certain new and useful Improvements in Couplings for Gas Mains or Pipes; and I do hereby declare the following to be a full, clear, and exact description of the invention, reference being had to the accompanying drawings, which form part of this specification, in which—

Figure 1:
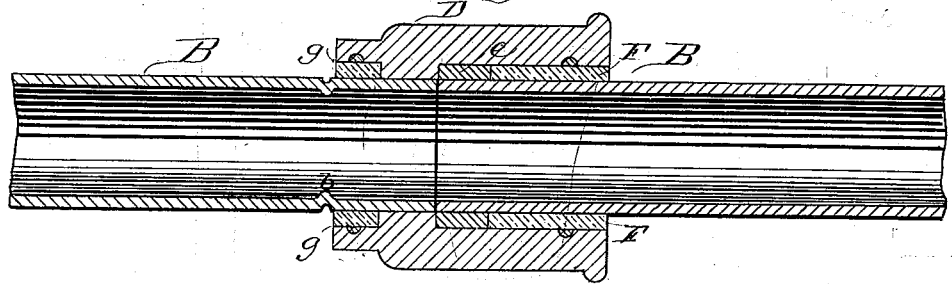
Figure 2:
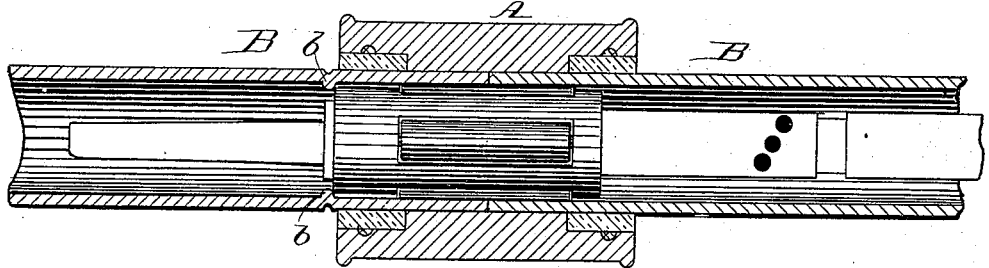
Figure 3:
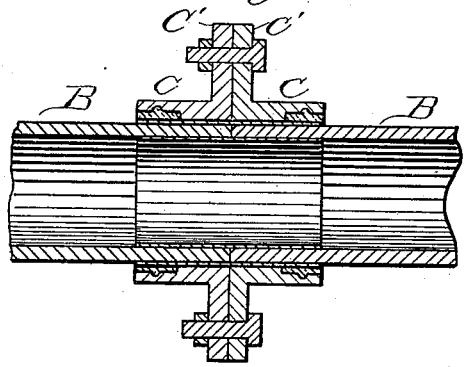
Figure 4:
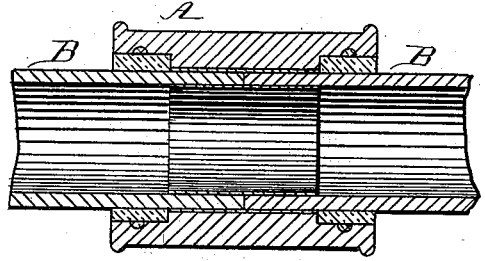

Figure 1 is a sectional view of adjacent ends of pipe-sections with collar in position thereon. Figs. 2, 3, and 4 are sectional views of modifications of the coupling as shown in Fig. 1.

The object of this invention is to provide a novel, useful, and comparatively inexpensive coupling for the joints of wrought-iron, cast-iron, malleable iron, steel, or other metallic pipes, such as is used for the conveyance of gas or liquids.

My invention particularly relates to the means for coupling the pipes employed in the conveyance of natural gas, where it is required that the joints should be exceptionally tight in order to prevent the escape of the gas, which, as is well known, cannot be retained by the couplings ordinarily used on pipes for the conveyance of other kinds of gas, or for steam.

My invention contemplates the provision of a novel means for coupling wrought-iron or other metallic pipes, wherein I dispense altogether with screw-threads or equivalent means for connecting the pipes to the coupling-sleeve, and employ an expedient which will necessitate no preparation of the pipes or coupling-sleeves, but will permit of the direct connection of the pipes or tubes to their collars or sleeves in such a manner as to insure a perfectly gas-tight joint.

For the purposes of my invention I employ cast, wrought, or malleable iron or steel, or other metallic sleeves having cylindrical bores of about the same internal diameter as the external diameter of the pipes; and my invention consists, broadly, in coupling or connecting the ends of the pipes to the sleeves by inserting said ends into a sleeve or collar made in one part, and having a central opening for the reception of the pipe ends, which opening at the point where the pipe comes into contact with its walls is of even diameter throughout—that is to say, is of cylindrical formation—and is adapted to fit snugly the end of the pipe which is placed therein, and then expanding the ends of the tubes until a rigid and perfectly close and gas-tight joint is produced.

A joint so produced has many advantages.

The entire work of coupling the pipes to the collars may be performed by unskilled labor, and in a very short time, less, in fact, than is required in connecting threaded pipes to a screw-coupling sleeve.

The joint when finished requires no additions in the shape of packing or sealing, as the expansion of the tube against the metal of the sleeve absolutely prevents leakage and renders the use of sealing mediums superfluous.

The coupling costs much less than the screw forms, as it requires the employment of nothing more than a simple metallic cylinder to serve as a collar and sleeve, and the metallic pipes or tubing of perfectly plain construction and finish.

In the accompanying drawings, wherein I have illustrated my invention as carried into effect, A designates a simple form of coupling-sleeve, which consists of a cylindrical tube of any desirable length and thickness, and B B two sections or lengths of wrought-iron or other metallic pipe, the adjacent ends of which are inserted into said coupling-sleeve and brought together, as shown. After such insertion an expanding-tool of any suitable character is inserted in the pipe from the free or uncoupled end, and the pipe expanded against the inner surface of the sleeve, in the same way as boiler-tubes are expanded.

To prevent the expanding-mandrel from entering too far, the pipes should be provided with slight internal projections or studs, $b\ b$, near its ends, against which the head of the mandrel abuts when thrust into the pipe. Such projections may be produced by drilling holes in the wall of the pipe and inserting and fastening pins therein; or they may be produced by simply indenting the tube on the outside, and thereby forming corresponding studs on the inner surface.

In the simplest embodiment of my invention the sleeve-coupling A consists of a cylinder the inner surface of which is of uniform bore, the expanded pipe contacting with the same throughout. In some cases, however, I enlarge the bore of the cylinder A for a short distance from either end, so as to leave a space, $a$, as shown in Fig. 2, for the insertion of a packing material, such as lead or other substance. I do not, however, consider such packing necessary in any but exceptional cases, as I find that the expansion of the pipe closes the joint, so as to render leakage almost, if not absolutely, impossible.

While my invention primarily consists in the method and means above specified, I have shown and will describe certain modifications within the spirit of the broad idea. For instance, in Fig. 3 I have shown a form of coupling wherein, instead of a single cylindrical tube constituting the coupling sleeve, I employ two coupling-heads, C C, consisting of short cylinders having wide flanges $C'C'$, which are bolted together, their abutting surfaces being planed to a true and even surface flush with the ends of the pipes.

This form of coupling is well adapted for connecting steam-pipes, as well as those intended for the conveyance of natural gas.

Under another modification of my invention, as shown in Fig. 1, I employ a bowl, D, in which one end of a pipe is inserted and fastened by expansion, so as to produce upon a wrought-iron or other metallic pipe a coupling-bowl, which I design for use under the same conditions and for the same purpose as the coupling-bowl on cast pipes. The end of the pipe to be coupled is provided with a collar, $e$, fastened thereon by shrinking or otherwise, and after the two pipes are coupled together lead or other suitable packing material, F, is filled into the space between the collar and the mouth of the bowl. If desired, an annular space, $g$, may be provided between the body of the pipe and the bowl, at the inner end of the latter, for the reception of packing.

I have described the coupling as consisting in expanding the pipe against the inner surface of the coupling-sleeve; but instead of bringing the casing and pipe into direct connection I purpose using an intermediate packing—such as a flat ring of copper, brass, or other metal—which I insert within the casing, so as to encircle the joint or seam produced at the junction of the two pipes. I may also employ a similar ring or band on the inner surface of the pipes, and in the act of expanding the pipes also expand the band, so as to incorporate it with the metal of the pipe, and thereby add to the security of the coupling against leakage.

Having described my invention, I claim—

1. A coupling for wrought-metal pipes or tubes, consisting of a coupling sleeve or bowl having a cylindrical opening of even diameter at that portion where it comes into contact with the pipe, and a pipe or tube having its end expanded into said opening, substantially as described.

2. In a pipe-coupling, the combination, with a sleeve, collar, or bowl having a central opening for the reception of the pipe end, of a band of copper or other metal inserted in said opening, and a pipe having its end expanded within said band.

3. In a pipe-coupling, the combination, with the sleeve, collar, or bowl, of the pipe ends inserted therein, and a band of copper covering the joint of the pipes and secured in position by expanding the ends of the pipes and the said band after they have been inserted in said sleeve or bowl, substantially as described.

In testimony that I claim the foregoing I have hereunto set my hand this 28th day of October, 1885.

JOSEPH BUSHA.

Witnesses:
A. A. CONNOLLY,
JNO. F. ATCHESON.